Feb. 10, 1942.   W. G. ELLIS   2,272,603
TRACTOR
Filed Jan. 6, 1941   4 Sheets-Sheet 1

Inventor:
WILLIAM GORDON ELLIS
By Eaton + Brown
Attorneys

Feb. 10, 1942.         W. G. ELLIS                2,272,603
                        TRACTOR
              Filed Jan. 6, 1941        4 Sheets-Sheet 3
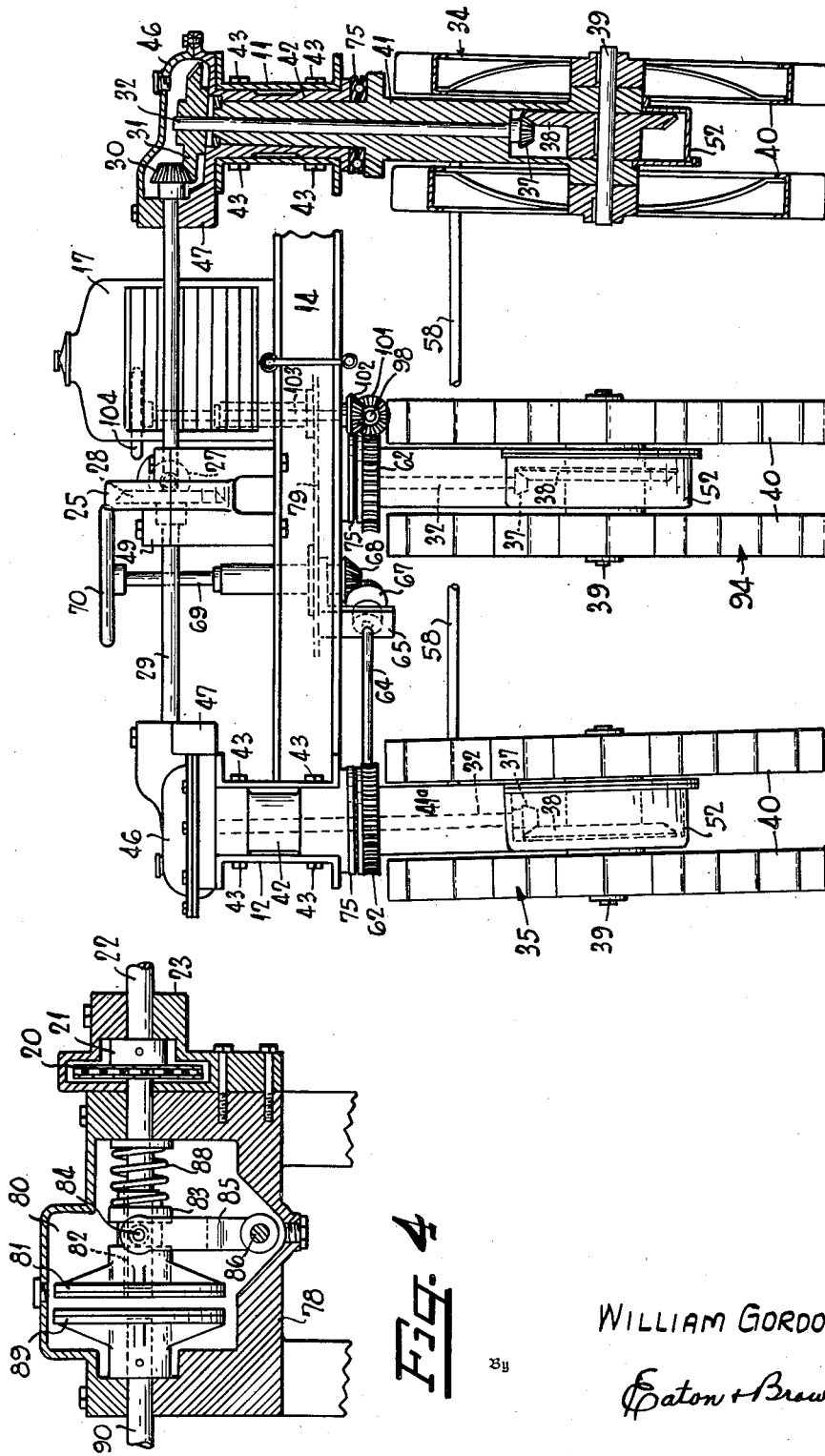
Inventor:
WILLIAM GORDON ELLIS
By
Eaton + Brown
Attorneys

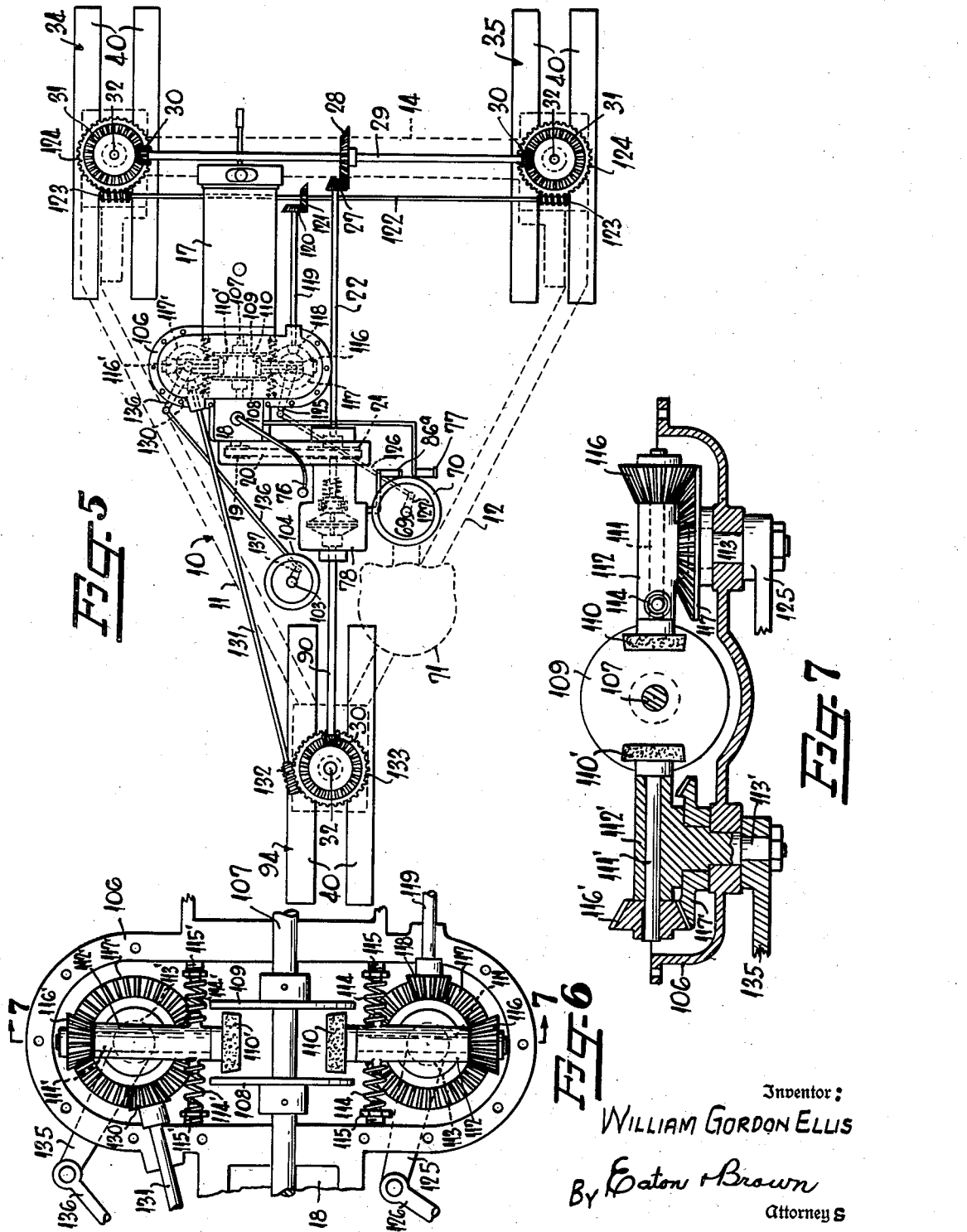

Patented Feb. 10, 1942

2,272,603

UNITED STATES PATENT OFFICE 2,272,603

TRACTOR

William Gordon Ellis, Shelby, N. C.

Application January 6, 1941, Serial No. 373,341

1 Claim. (Cl. 180—26)

This invention relates to tractors and more especially to an improved design so constructed that the turning and traction qualities are more effective. It is often very desirable to have a tractor constructed so that it can be maneuvered in and out of close places such as fence corners or alongside terraces, ditch banks and the like. Maneuverability is particularly important when the tractor is employed to draw some other trailing implement such as a plow, harrow or the like. Where a short turn must be made, the tractor and associated implements can be operated in difficult areas which would otherwise be inaccessible with tractors having steering equipment with a long radius of turn.

There is also much difficulty encountered during the operation of conventional tractors on account of the lack of means for driving certain of the wheels when the other wheels begin to spin. Such trouble is more noticeable with tractors employing a differential between the driving wheels, because the wheel offered the least resistance by the ground will often turn while the companion wheel stands still.

It is an object of this invention to provide a tractor having positively driven dirigible front and rear wheels so that the above-named difficulties heretofore encountered in conventional tractors can be largely eliminated. When each of the wheels are positively driven and steered, the likelihood of the tractor becoming stuck in mud or soil is very much reduced, because all of the wheels can be driven in unison from one source of power and can be directed more effectively to follow a desired course.

It is another object of this invention to provide a tractor of the class described having a pair of positively driven dirigible front wheel units and a single dirigible rear wheel unit which is also positively driven, in combination with a clutch for disconnecting the rear wheel unit from the driving means. There is much advantage to be gained in having the pair of wheel units at the front of the tractor, and in having the single wheel unit at the rear of the tractor, especially when operating the tractor on a hillside. In hillside operations, there is a tendency for the rear end of most tractors to skid laterally of its course of travel toward a lower level. This skidding can be largely eliminated by having the rear wheels dirigible so that these wheels or wheel can be set at the desired angle to prevent the skidding.

It is a further object of this invention to provide a tractor of the class described having a novel power steering apparatus which will employ the power of the tractor motor instead of the manual effort of the driver for steering the tractor. It is well known that most vehicles are more easily steered while in motion that while stationary, especially, in the case of tractors whose wheels often operate in loose soil and the like. By employing the power of the tractor motor for turning these wheels, the present invention makes it possible for the tractor to be steered as easily when stationary as when in motion so far as the manual effort of the driver is concerned.

Some of the objects of the invention having been stated, other objects will appear as the description proceeds, when taken in connection with the accompanying drawings, in which—

Figure 3 is an elevation looking at the right-hand end of Figure 2;

Figure 4 is a longitudinal sectional view taken along the line 4—4 in Figure 1, through the clutch mechanism for disconnecting the dirigible rear wheel unit from the tractor motor;

Figure 5 is a schematic plan view of the tractor illustrating an improved power steering mechanism;

Figure 6 is an enlarged detail view showing the connection between the power steering mechanism and the main drive shaft of the motor;

Figure 7 is a vertical sectional view taken along the line 7—7 in Figure 6.

Figure 1:
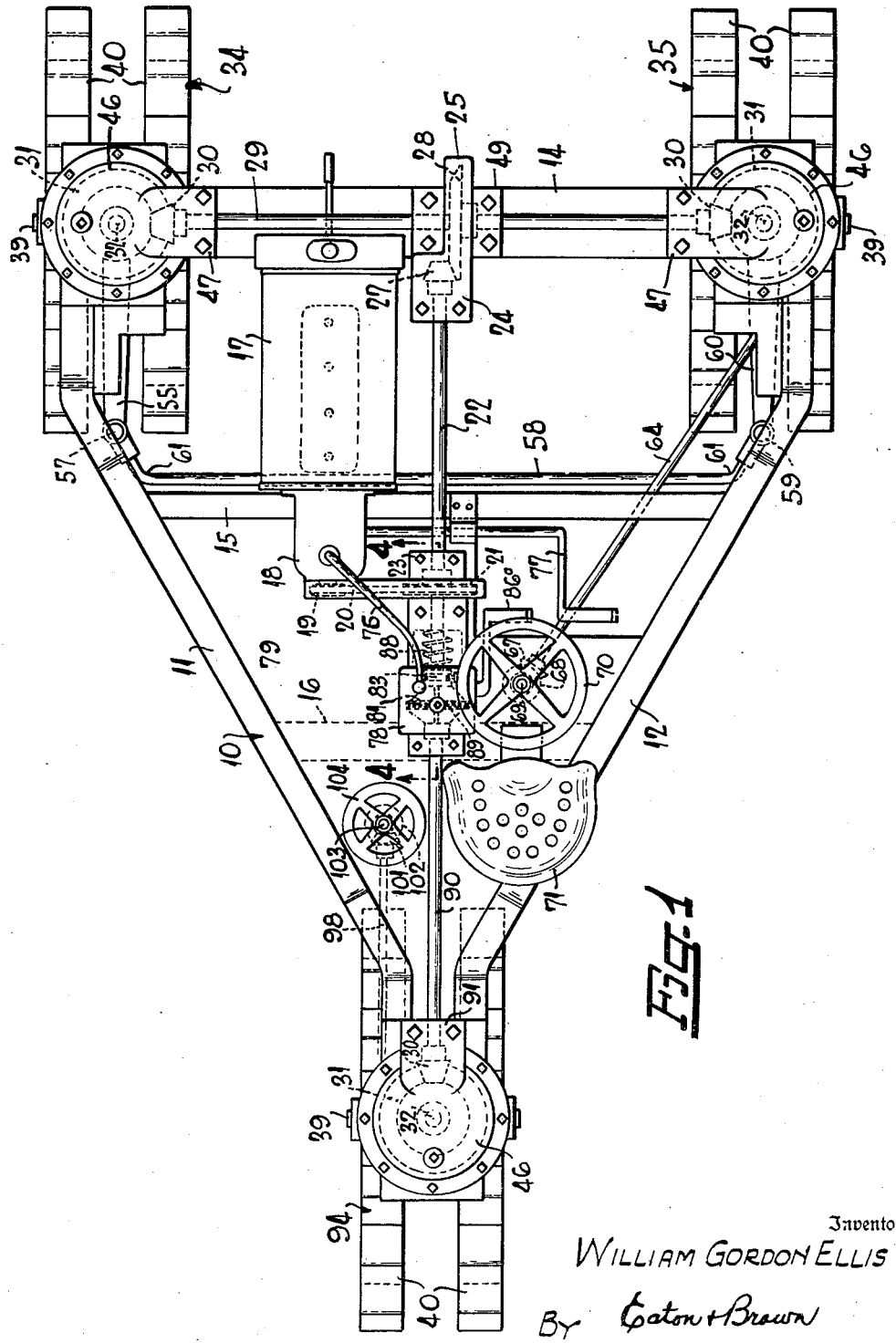
Figure 1 is a plan view of my improved tractor.

Referring more particularly to the drawings, the numeral 10 broadly designates the main framework of my improved tractor, which framework comprises essentially of two diverging side-members 11 and 12, having cross strut members 14, 15 and 16 connecting the diverging ends at spaced intervals. A suitable power unit such as an internal combustion engine 17 is supported by cross members 14 and 15. This power unit has a conventional transmission 18 which drives a sprocket 19 upon which a chain 20 is mounted.

Chain 20 is also mounted upon a second sprocket 21 on drive shaft 22, and this drive shaft has its ends rotatably mounted in suitable bearings 23 and 24. (See Figures 1, 2 and 4.) The bearing 24 is an integral part of housing 25, which housing is employed for encasing a beveled geared connection, comprising pinions 27 and 28. The pinion 27 is fixedly secured on the right hand end of shaft 22, whereas the pinion 28 is fixedly secured upon a shaft 29 which is disposed substantially at right angles to the shaft 22.

Each end of the shaft 29 has a pinion 30 mounted thereon which meshes with another pinion or gear 31 on the upper end of each of the vertically disposed shafts 32. In other words, each end of the shaft 29 drives a front wheel unit. Each unit is substantially the same in construction; therefore like reference characters will be given like parts and a detail description will be made only of one unit. For convenience of description, the front wheel units will be broadly designated by the reference characters 34 and 35. By referring to Figure 3, the detail construction of the wheel units will be more clearly understood. It is here seen that the lower end of the vertically disposed shaft 32 has a beveled geared connection associated therewith comprising a pinion 37 which meshes with a gear 38, said gear 38 being fixedly secured upon axle or shaft 39. Each end of the axle or shaft 39 has fixedly secured thereon a wheel 40. The wheels 40 of units 34 and 35 are disposed in pairs and are spaced apart from each other a sufficient distance to permit the lower forked ends of sleeves 41 and 41a respectively to be mounted around the rotating axles 39.

Sleeve 41 extends upwardly and acts as a bearing for vertically disposed shaft 32. The exterior of the sleeve 41 is rotatably mounted in bearing 42 which is removably secured to one corner of the framework 10 by any suitable means such as bolts 43.

In order to insure that the gears 30 and 31 will be properly lubricated at all times a housing 46 has been provided which encases these members and serves to hold a suitable supply of oil or other lubricant therein.

Each of the housings 46 has integral therewith a bearing 47 which serves as a support for the ends of shaft 29. The shaft 29 has its intermediate portion journaled in a bearing 49 which is an integral part of housing 25 supported by the cross member 14. Likewise the housing 25 serves as a means for maintaining a supply of lubricant for the beveled gears 27 and 28.

In order to maintain a supply of lubricant for the beveled gears 37 and 38 which are disposed between the spaced wheels 40, a similar housing 52 is provided.

As heretofore stated the wheel units 34 and 35 are located at the front of the tractor framework 10, and are adapted to be steered in unison during the operation of the tractor. In order that both wheel units will move together it is necessary to provide a suitable arm 55 which extends rearwardly from the sleeve 41 of unit 34 (see Figure 1). Pivotally connected to the rear end of arm 55 as at 57 is a cross link 58, the other end of which is pivoted as at 59 to a second arm 60, which extends rearwardly from sleeve 41a of the wheel unit 35. It is seen that the link 58 is bent as at 61 (Figure 1) so that the proper clearance between the wheel unit and the link will be provided during turning. In other words, by having the link 58 bent as shown the wheels can be turned substantially at right angles to the position shown in the drawings without the link striking the wheels.

The sleeve 41a of the wheel unit 35 has a worm gear 62 fixedly secured therearound, substantially at the same level as the top of the wheel unit. Meshing with this gear is a worm 63 on one end of a shaft 64, said shaft being journaled in bearings 65 and 66. The other end of the shaft 64 has fixedly secured thereon a beveled gear 67 which meshes with a second beveled gear 68 on the lower end of steering column 69, and the upper end of the steering column has a suitable steering wheel 70 fixed thereon which is employed by the driver for turning the wheel unit in the desired direction during the operation of the tractor. A suitable seat 71 is provided at a convenient location on the tractor framework for the driver's use during normal operation of the tractor.

It will be noted that there is one difference between the sleeves 41 and 41a of wheel units 34 and 35 respectively, in that the worm gear 62 is omitted from sleeve 41. Obviously the reason for this omission is that there is no necessity for driving the wheel unit 34 positively from two different sources since the link 58 and arms 55 and 60 are provided for this purpose. If desired, suitable ball bearings 75 may be provided around sleeves 41 and 41a and below the bearings 42 in order to reduce the friction between the parts at these points during the steering of the wheel units 34 and 35.

The transmission 18 is equipped with a conventional gear shift lever 76, the upper end of which is preferably disposed in close proximity to the driver's seat 71. This lever may be operated in a conventional manner to regulate the speed at which the wheel units are driven. Also the transmission is equipped with a suitable clutch pedal 77 which is likewise disposed in close proximity to the driver's seat and which is used when it is desired to change gears within the transmission housing 18.

Figure 2:
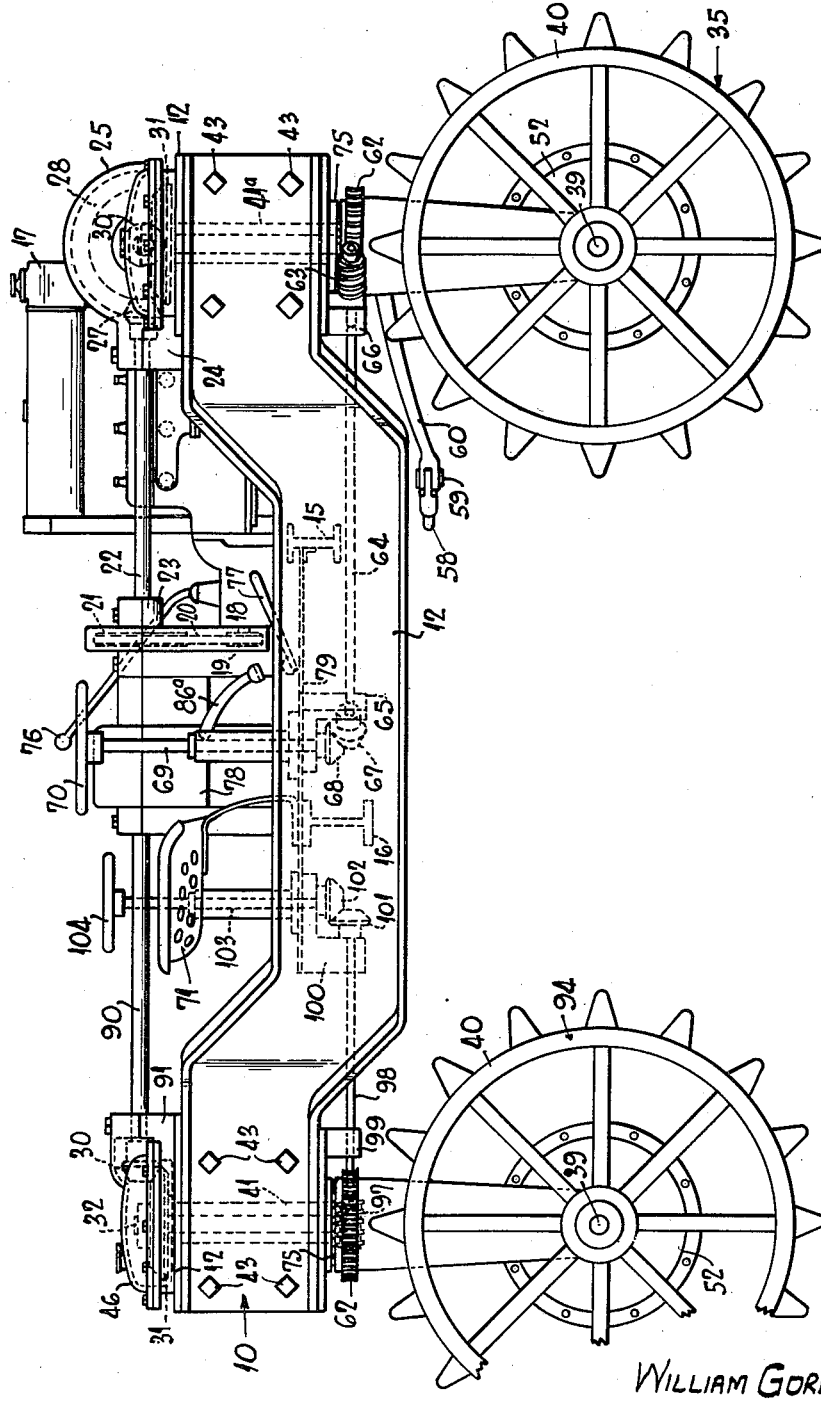
Figure 2 is a side elevation of the tractor.

By referring to Figures 1 and 4 it is seen that the left-hand end of the shaft 22 is also journaled in a suitable upstanding bracket 78, said bracket being supported by floor 79 which, in turn, is supported by cross members 15 and 16 as well as side members 11 and 12. Bracket or stand 78 has a cavity 80 therein for housing a suitable clutch mechanism. This clutch mechanism comprises a disk 81 which is slidably keyed on shaft 22 as at 82, said disk having integral therewith a grooved hub 83 which accommodates suitable pins 84 in the upper end of a forked member 85. The lower end of the forked member 85 is fixedly secured around a shaft 86 and this shaft extends to the exterior of the housing and has a suitable foot lever 86a forming an integral part thereof, which pedal is adapted to be engaged by the operator's foot when it is desired to slide the disk 81 along the shaft 22.

A spring 88 is disposed around the shaft 22 between the grooved hub 83 and the interior face of the cavity 80. This spring normally tends to move the disk 81 to the left in Figure 4 and into engagement with a companion disk 89 on another shaft 90. The shaft 90 has one end thereof rotatably journaled in bracket 78 and its other end journaled in bearing 91.

In Figure 4 the clutch disks 81 and 89 are shown in a disengaged position and in such a position it is necessary for downward pressure to be applied to the foot pedal 86a. During normal operation, when there is no pressure exerted upon foot pedal 86a, the spring 88 causes the proximate faces of the disks 81 and 89 to become engaged and therefore connects the shaft 90 with the power unit 17.

The shaft 90 serves to drive a single rear wheel unit broadly designated by the reference character 94. The mounting and the essential structure of this wheel unit are identical to that of the wheel unit 35 previously described and therefore another description will not be made but like reference characters will be given like parts. The steering mechanism however, for the rear wheel unit 94 is slightly different. This steering mechanism comprises a worm 97 disposed upon one end of a horizontally disposed shaft 98, which shaft is rotatably mounted in bearings 99 and 100. The right-hand end of the shaft 98 in Figure 2 has a beveled gear 101 fixedly secured thereon and this beveled gear meshes with another beveled gear 102 on the lower end of a vertically disposed steering column 103. The upper end of the steering column has a suitable steering wheel 104 mounted thereon which is disposed in close proximity to the driver's seat 71. In other words, the rear wheel unit 94 is steered independently of the front wheel units 34 and 35.

The advantages of having a single positively driven dirigible rear wheel unit, independently operable of the front wheel units, is very much in evidence when operating the tractor on a hillside. In hillside operations, there is a tendency for the rear end of a tractor to skid laterally of its line of travel to a lower level, and therefore make it very difficult to hold the tractor framework in the proper position for accomplishing the particular duty which it must perform. Should the present tractor be operating upon a hillside and the skidding of the rear wheel unit should begin, it would be only necessary to operate the steering wheel 104 so as to set the rear wheel unit 94 at the proper angle to compensate for this skidding. At the same time, the rear wheel unit is positively driven along with the front wheel units 34 and 35 thereby eliminating to a large degree the possibility of the tractor becoming stuck or stalled in soft ground.

One purpose of providing the clutch mechanism as shown in Figure 4 is to facilitate the turning of the tractor. It is often desirable, especially when making short turns, to disconnect the rear wheel unit 94 from the engine and allow the tractor to be propelled by the front wheels only. In such case it is only necessary to depress the foot pedal 86a, and the clutch disks 81 and 89 will be disengaged. Attention is called to the fact that all of the wheels may be turned at substantially right angles to the position shown in the drawings, thereby making it possible to rotate the entire tractor framework about the vertical center line of the tractor. If desired the wheels may be turned at such an angle that the framework may be rotated about either the front wheels or the back wheel as a pivot. In case it should be desired to turn the tractor framework about the vertical center line of the tractor, it would be necessary to turn the front wheels at substantially a 90 degree angle to the longitudinal axis of the framework of the tractor so that they will move in one direction and to rotate the rear wheel unit 94 to a position substantially at right angles to the longitudinal center line of the tractor so that it will move in the opposite direction. Such an arrangement has the advantage of making the tractor capable of maneuvering in very close places and also in pulling itself out of very difficult places which would otherwise be impossible were a differential structure provided between the driven wheels.

Figures 5, 6 and 7 show an improved type of power steering mechanism which may be used with the present embodiment of the invention so that the driver will be relieved of much physical effort when steering the tractor. In this form of the invention like reference characters will be given to like parts and a description will only be made of the structural changes employed. In this form of the invention a suitable housing 106 has been interposed between the power unit 17 and the transmission 18. This housing has a conventional drive shaft 107 extending therethrough, upon which is fixedly secured suitable spaced disks 108 and 109. Disposed between these disks in a normally disengaged position and along one side of the shaft 107 is a suitable roller 110 made of fiber or the like, which roller is fixedly secured upon a shaft 111, said shaft being rotatably mounted in bearing 112. The bearing 112 has integral therewith a downwardly extending spindle 113 which is rotatably mounted in the lower portion of casing 106 (Figure 7).

In order to normally hold the fiber roller 110 in a non-contacting position with the disks 108 and 109, suitable compression springs 114 are provided on each side of the bearing 112 (see Figure 6). These springs are normally confined against bearing 112 by means of suitable adjustment screws 115 which are threadably secured on the interior of the casing.

The end of the shaft 111 has a beveled pinion 116 fixed thereon which meshes with a beveled gear 117 said beveled gear 117 being rotatable around spindle 113. Beveled gear 117 also has meshing therewith a beveled gear or pinion 118 on one end of a shaft 119, and this shaft has a beveled gear 120 (Figure 5) on the other end thereof which meshes with beveled gear 121 on cross shaft 122. Each end of cross shaft 122 has a worm 123 thereon for meshing with worm gears 124, each of which are associated with one of the front wheel units 34 and 35 previously described.

The worm gears 124 are located substantially in the same position relative to the wheel units as the worm gears 62 previously described. It is therefore seen that when the fiber roller 110 is rotated into engagement with either of the disks 108 or 109 that the wheel units 34 and 35 will be turned through the medium of parts 110, 111, 116, 117, 118, 119, 120, 121, 122, 123 and 124.

In order to determine which disk the roller 110 will engage to determine the direction in which the wheel units 34, 35 are turned, a suitable arm 125 has been secured on the lower end of spindle 113 at a point below the housing 106. (See Figures 6 and 7.) Pivotally secured to the free end of the arm 125 is a link 126, the other end of which is pivotally secured to an arm 127 on the lower end of steering column 69. When the steering wheel 70 is rotated by the operator, this rotation will be imparted to the spindle 113 and bearing 112 to thereby cause the fiber gear 110 to selectively engage one of the disks 108 or 109 to cause the power unit 17 to steer the front wheel units.

In order to provide a similar power steering mechanism for the rear wheel unit 94 an identical structure has been provided, and therefore another description will not be made, but like reference characters will be given to like parts with prime notation added thereto. It will be noted that this mechanism is located on the opposite side of the drive shaft 107 from the mechanism previously described. The gear 117' has a pinion 139 meshing therewith, which pinion is fixedly secured on one end of shaft 131. The other end of the shaft 131 has a worm 132 fixedly secured thereon which meshes with worm gear 133, said worm gear 133 being substantially the same, and located at substantially the same place relative to wheel unit 94, as the worm gear 62 shown in Figure 2.

In order to cause the fiber roller 110' to selectively engage one of the disks 108 and 109, a suitable arm 135 is fixedly secured on the lower end of spindle 113'. The free end of this arm has a link 136 connected thereto, the other end of said link being connected to the free end of an arm 137 on the lower end of steering column 103. By turning the steering wheel 104, which is located on the upper end of the steering column 103, the roller 110 can be caused to engage either of the disks 108 or 109 to thereby cause the power of the motor to supplant the physical effort of the driver when steering the tractor.

Another advantage of this tractor is in having all of the power in the wheels in turning. When turning other tractors, one of the rear wheels must be stopped leaving only one wheel to do the pulling. When other tractors are headed down hill and start turning the front end uphill it is impossible to turn short unless the load is very light.

In the drawings and specification, there has been set forth a preferred embodiment of the invention, and although specific terms are employed, they are used in a generic and descriptive sense only and not for purposes of limitation, the scope of the invention being set forth in the following claim.

I claim:

In a tractor having two spaced front steerable wheel units and a single steerable rear wheel unit, each of said wheel units comprising a vertically disposed sleeve mounted for rotation near its upper end in the frame, a vertically disposed shaft rotatably mounted in the sleeve, a transverse shaft mounted in the lower end of the sleeve and extending at each end beyond the sleeve, a wheel fixed on each end of the shaft, a geared connection between the vertical shaft and the transverse shaft, a motor on the tractor, a rigid shaft driven by the motor and extending longitudinally of the tractor and having a driving connection with the vertical shaft of the rear wheel unit, a second rigid shaft disposed in alinement with the first rigid shaft, a clutch between the proximate ends of the shafts, a driving connection between the second shaft and the motor, a transversely disposed rigid shaft disposed between the two front wheel units, a geared connection between the transversely disposed shaft and the second shaft, a geared connection between the ends of the transversely disposed shaft and each of the vertical shafts of the front wheel units whereby the two front wheels will be driven at the same speed under all directions of travel, means for moving said clutch to disconnect the second shaft from the first shaft to thereby disconnect the engine from the rear wheel unit.

WILLIAM GORDON ELLIS.